(No Model.) 2 Sheets—Sheet 1.
P. K. DEDERICK.
BALING PRESS.
No. 251,768. Patented Jan. 3, 1882.
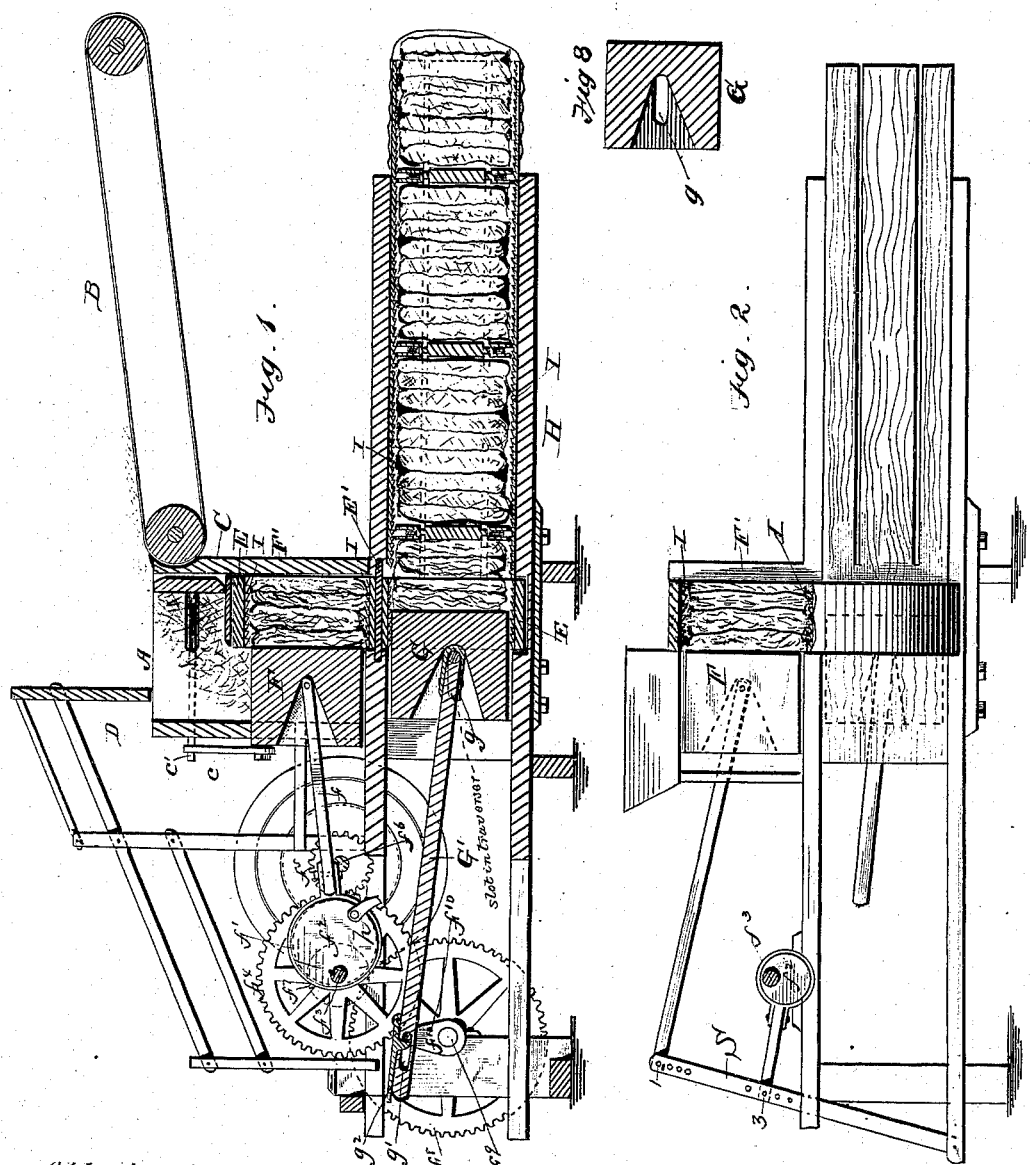

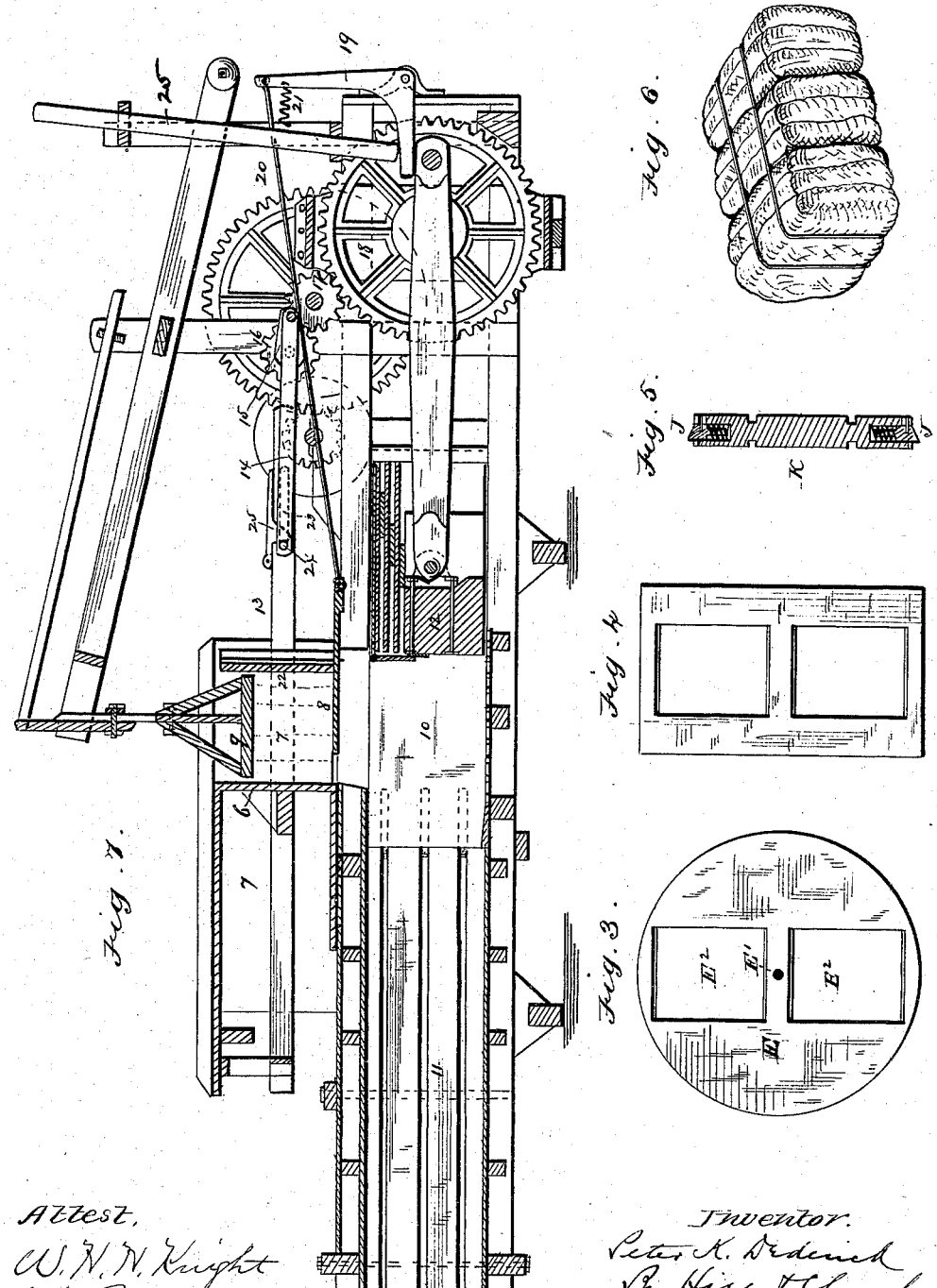

UNITED STATES PATENT OFFICE.

PETER K. DEDERICK, OF ALBANY, NEW YORK.

BALING-PRESS.

SPECIFICATION forming part of Letters Patent No. 251,768, dated January 3, 1882.

Application filed May 14, 1880. (No model.)

*To all whom it may concern:*

Be it known that I, PETER K. DEDERICK, of Albany, in the county of Albany and State of New York, have invented certain new and useful Improvements in Baling-Presses; and I do hereby declare the following to be a full, clear, and exact description of the same, reference being had to the accompanying drawings, forming part of this specification, in which—

Figure 1 represents a longitudinal vertical section of a press embodying my improvements. Fig. 2 is a side elevation of a modification of the means for operating the condensing-traverser. Fig. 3 is a view of the revolving die-wheel; Fig. 4, a view of a reciprocating die; Fig. 5, a view of one of the partitions or followers employed for separating the bales and assisting in applying the ties. Fig. 6 is a perspective view of a bale formed or built up in sectional sections by my new process. Fig. 7 is a view of a modified form of machine for carrying out the new process of baling; and Fig. 8 is a sectional view of the traverser, showing the slot $g$ therein.

Similar letters of reference in the several figures denote the same parts.

This invention relates to improvements in that class of baling-presses known as "continuous" or "perpetual" presses, and covered by Letters Patent Nos. 132,566 and 132,639, granted to me October 29, 1872, and by numerous other patents granted to me since that date.

The present invention consists in certain novel improvements, which will be first described, and then pointed out particularly in the claims.

In the drawings, A represents the hopper of the press, into which the loose cotton is delivered by means of an intermittingly-operated endless apron, B, leading to the gin; C, a reciprocating condenser arranged within the hopper and adapted to compact the cotton into loose bundles; D, an automatic feeder for forcing the loose bundles of cotton into the lower portion of the hopper; E, a rotary die-wheel mounted upon a central axis or pivot, E', and adapted to rotate through the lower portion of the hopper and in front of the inner end of the bale-chamber. Said die-wheel is provided with transverse openings $E^2 E^2$, which extend way through it, as shown.

F is a condensing-traverser, adapted to force the successive loose bundles of cotton from the lower portion of the hopper into the openings or compartments in the die-wheel and to condense them therein into a bale section or charge against a wall or abutment, F'; G, the pressing-traverser for forcing out the condensed charges of material from the die-wheel and carrying them into the bale-chamber, and H the bale-chamber in which the bale is formed. The condensing-traverser and the pressing-traverser are so timed in their operations that the former makes two, three, or more strokes while the latter is making but one, and while the condensing-traverser in its forward stroke barely enters one of the openings in the die-wheel the pressing-traverser passes way through the other opening and into the bale-chamber. From this arrangement it will be seen that the operation of the condensing-traverser is to condense several of the loose bundles of cotton into one of the openings in the die-wheel by successive strokes, so as to form a charge composed of several sections, while the operation of the pressing-traverser is to force out or discharge from the other opening a previously-formed sectional charge and press it into the bale-chamber.

The die-wheel, as before stated, is mounted upon a central axis, so that it can be revolved to bring its openings or compartments alternately in front of the condensing and the pressing traversers. It may be revolved by hand or automatically; but in either case suitable stops or catches should be provided for arresting it when its openings are in line with the traversers.

The openings in the wheel may be more than two in number, and should be of the same, or of a slightly smaller, size than the area of the inner end of the bale-chamber, so that the charges may be readily forced into the latter by the operation of the pressing-traverser.

Two or more of the walls of the openings in the die-wheel, as well as two or more of the walls of the bale-chamber, may be provided with ratchet-strips I, for the purpose of preventing the back expansion of the cotton, and also for the engagement of spring slides or catches J on the sides of the followers K, (shown in Fig. 5;) and ordinary retainers may be applied to the openings, if deemed necessary or desirable.

The followers may be inserted through the hopper and carried into the die-wheel and discharged thence into the bale-chamber in the same manner as the sectional charges of cotton; or they may be inserted through an opening in the side of the bale-chamber, at the inner end of the latter and just back of the die-wheel, by a device such, for instance, as shown in my Patent No. 177,216, dated May 9, 1876, or otherwise. The engagement of the slides or catches in the followers with the ratchet-strips in the walls of the openings and bale-chamber, besides assisting in preventing the back expansion of the material, also prevents the followers from falling down and becoming displaced.

The usual grooves or recesses are made in the faces of the followers for the passage of the wires with which the completed bales are tied off.

Motion is imparted to the condensing-traverser by means of a pitman, $f$, connected to an eccentric strap, $f'$, on an eccentric, $f^2$, secured to a shaft, $f^3$, and the latter is provided with a gear-wheel, $f^4$, which meshes with a pinion, $f^5$, on the balance-wheel and driving pulley shaft $f^6$. Shaft $f^3$ is further provided with a pinion, $f^7$, which meshes with and drives a large gear-wheel, $f^8$, on a shaft, $f^9$. Secured to said last-mentioned shaft is a crank, $f^{10}$, to which is connected the pitman G' of the pressing-traverser.

The reciprocating condenser C derives its motion from the condensing-traverser through arms $c$ on the rear of the traverser and slides $c'$, connected thereto and to the condenser, as clearly shown. With this arrangement of gearing it is designed that the condensing-traverser shall make two or three strokes while the pressing-traverser makes but one, so that one sectional charge will be formed in one of the openings or compartments by the condensing-traverser while the pressing-traverser is discharging a previously-formed sectional charge into the bale-chamber.

It is desirable that the crank to which the pitman of the pressing-traverser is connected should be of considerable length, in order that the toggle formed by such crank and pitman may operate more powerfully; but it is also desirable that the stroke of the traverser be not increased by the employment of such long crank. Therefore, instead of connecting the pitman directly to the traverser, as is usual, I form a slot, $g$, in the traverser, and cause the head of the pitman to play back and forth in such slot, as shown in Fig. 1. In this way the objection to the long crank is overcome, while the advantage of its increased power is retained.

Another mode of accomplishing the same result is to form a slot, $g'$, in the outer end of the pitman and allow the crank to play back and forth therein; and in such case the slot in the traverser may be dispensed with, or slots may be provided in both traverser and pitman, as shown in Fig. 1, in which case a hook or catch, $g^2$, will be hinged or pivoted to the pitman, so that it can be swung down and confine the crank between it and the end of the slot in the pitman, and thus cause the traverser to be operated, or else swung up out of engagement with the crank, so as to give play to the crank and allow the traverser to remain entirely stationary.

Instead of a rotary die-wheel, a die such as shown in Fig. 4 may be arranged to reciprocate back and forth transversely of the press-box, so as to bring its openings or compartments alternately in front of the filling-hopper and bale-chamber.

The feeder D is constructed in the usual manner, and is operated by means of a lug or projection, $p$, on the side of the eccentric $f^2$, or by any other equivalent arrangement.

To operate the press, power is applied to the balance-wheel shaft and the machinery set in motion. The cotton is fed into the hopper by means of the intermittently-operated endless belt, or in any other manner. As the condensing traverser moves backward out of the lower portion of the hopper the condenser C is carried forward toward the opposite wall of the hopper and gathers the cotton into a loose bundle. The blade of the feeder then comes down and forces the loose bundle into the lower portion of the hopper, after which the condensing-traverser F moves forward and deposits it within the opening in the die-wheel. This operation is repeated until the opening in the wheel is filled by the introduction of several successive bundles, whereupon the wheel is rotated so as to bring the other opening in front of the condensing-traverser and the charged opening opposite the bale-chamber and in front of the pressing-traverser. While the condensing-traverser is filling the upper opening, as before described, the pressing-traverser forces the sectional charge out of the lower opening and into the bale-chamber. When a sufficient number of charges have been carried into the bale-chamber a partition or follower is introduced, as before described, and another bale formed against it, and the first bale tied off in the usual manner. It will be observed that the bale thus formed is composed of separate charges, each of which is itself divisible into sections.

The cotton-bales made on my previous presses are built up of successive charges; but the latter are so large that they have to be pulled apart at the factory before they can be fed to the machinery by which the cotton is first manipulated in the course of its manufacture, and they are objectionable on that account. In the present bale, however, each section or charge is itself made divisible into smaller sections, so that when the bale is opened the sections may be readily separated into sheets or flakes of a size adapted to be fed directly to the machinery without previous manipulation.

When the openings in the die are provided with retaining-shoulders, the stroke of the condensing-traverser should be made longer; and one means of accomplishing this result is shown in Fig. 2, where, instead of connecting the pitman of the condensing-traverser directly to the operating eccentric or crank, said pitman is connected at 1 to a sway-bar, S, pivoted to the frame at 2, and another pitman operated from the eccentric connected to the sway-bar at 3. An increased stroke of the condensing-traverser is thus produced by the same eccentric or crank. To vary the length of the stroke of the condensing-traverser with this arrangement, the pitman may be connected to the sway-bar, nearer to or farther from the fulcrum of the sway-bar, by means of pins and series of holes, as illustrated in said Fig. 2, or otherwise.

The new method herein described of forming bales may be accomplished without the use of dies by a press constructed like the one shown in Fig. 7, wherein 6 represents a reciprocating condenser; 7, a hopper in which the condenser works; 8, a movable bottom for the hopper; 9, an automatic feeder; 10, the press-box; 11, the bale-chamber, and 12 the reciprocating traverser. The reciprocating condenser is operated from the crank-wheels 18 by means of slides 13, a pitman, 14, and a crank, 15, and gears 16 and 17, as shown, so that said condenser will make several strokes while the traverser is making but one stroke. The movable bottom is operated in one direction by means of a bell-crank lever, 19, pivoted to the frame of the press so that its short arm will lie in the path of the end of the traverser-pitman, and a connecting-rod, 20, jointed to the end of the long arm of the bell-crank, and in the other direction by a spring, 21. The feeder is also actuated by the end of the traverser-pitman in the usual manner.

To understand the operation of this form of press, let it be supposed that the crank end of the traverser-pitman has just passed the feeder-staff 25 and the short arm of the bell-crank, and that the traverser has started on its forward stroke, at which time the movable hopper-bottom will be slid in and held by the action of the spring 21 on the bell-crank 19. While the traverser is moving forward and returning the condenser makes several reciprocations, and at each reciprocation carries a bundle of loose material toward the wall 22 of the hopper and between the feeder-platen and the hopper-bottom, thus filling the space. The end of the traverser-pitman again strikes the short arm of the bell-crank before the traverser begins to move forward a second time and causes the sliding bottom to be withdrawn from the hopper, and immediately thereafter, and still before the traverser starts forward, the feeder is operated and the sectional charge of material is forced down by it into the press-box in front of the traverser. The latter then advances and carries the charge into the bale-chamber.

In order that the condenser may remain stationary after the sectional charge has been completed, and before the same is forced into the press-box, the slides 13 and pitman 14 are combined, so as to be readily disconnected at the proper time. The device employed for this purpose may consist of a slot, 23, in the slide, a pin, 24, in the pitman playing in such slot, and an engaging-hook, 25, hinged to the slide, as shown.

I claim as my invention—

1. The herein-described process or method of forming cotton-bales, consisting in condensing separate successive flakes of cotton into a charge or section and then compressing the several charges into a bale.

2. In a baling-press, the combination of a movable die, a condensing-traverser for depositing successive flakes of material into the die to form a sectional charge, a bale-chamber, and a pressing-traverser for forcing the charges out of the die and into the bale-chamber, substantially as described.

3. In a baling-press, the combination of a condensing-traverser, a pressing-traverser, a movable die having openings adapted to be alternately presented to the condensing and pressing traversers, and a bale-chamber into which the sections or charges are forced by the pressing-traverser and formed thereby into bales, substantially as described.

4. In a baling-press, the combination of a die-wheel having two or more compartments or openings with a condensing-traverser, a pressing-traverser, and a bale-chamber, substantially as described.

5. In a baling-press, the combination of a die having two or more compartments or openings with a condensing-traverser, a pressing-traverser, and mechanism for imparting two or more strokes to the condensing-traverser while the pressing-traverser is making but one stroke, substantially as described.

6. The combination of the hopper, the reciprocating condenser arranged in the upper part thereof, the condensing-traverser, the die-wheel, the pressing-traverser, and bale-chamber.

7. The combination of the hopper, the reciprocating condenser arranged in the upper part thereof, the automatic feeder, the condensing-traverser, the die-wheel, the pressing-traverser, and bale-chamber, substantially as described.

8. The combination of the long crank, the pitman, and the pressing-traverser, slotted to permit the play of the pitman-head, substantially as described.

9. The slotted pitman, in combination with the crank and the hinged hook, substantially as described.

10. The combination, with the press-box, bale-chamber, and reciprocating traverser of a continuously-operating baling-press, of a condensing-traverser for depositing successive flakes of material into a chamber to form a sectional charge, and means for carrying such sectional charge into the bale-chamber of the press in position for it to be forced forward into the bale-chamber by the operation of the reciprocating traverser of the press, substantially as described.

P. K. DEDERICK.

Witnesses:
R. J. VAN SCHOONHOVEN,
W. A. SKINKLE.